United States Patent [19]

Marwah et al.

[11] Patent Number: 5,527,426
[45] Date of Patent: Jun. 18, 1996

[54] MAGNETIC DEINKING OF WASTE PAPERS

[75] Inventors: Nipun Marwah, Charleston; Allen A. Gold, Goose Creek, both of S.C.

[73] Assignee: Westvaco Corporation, New York, N.Y.

[21] Appl. No.: 238,478

[22] Filed: May 5, 1994

Related U.S. Application Data

[63] Continuation-in-part of Ser. No. 183,746, Jan. 21, 1994.

[51] Int. Cl.⁶ .................................................. D21C 5/02
[52] U.S. Cl. ........................ 162/5; 162/4; 162/55; 205/39; 205/221; 205/224; 210/695
[58] Field of Search .................. 209/39, 221, 224; 162/4, 55, 5; 210/695

[56] References Cited

U.S. PATENT DOCUMENTS

| | | | |
|---|---|---|---|
| 4,013,505 | 3/1977 | Balcar et al. | 162/5 |
| 4,076,578 | 2/1978 | Puddington et al. | 162/5 |
| 4,081,316 | 3/1978 | Oberg | 162/4 |
| 4,147,616 | 4/1979 | Balcar et al. | 209/12 |
| 4,176,054 | 11/1979 | Kelley | 209/8 |
| 4,194,968 | 3/1980 | Pfalzer et al. | 162/4 |
| 4,203,376 | 5/1980 | Hood | 110/346 |
| 4,354,930 | 10/1982 | Makajima | 209/221 |
| 4,381,969 | 5/1983 | Ceuster et al. | 162/5 |
| 4,440,635 | 4/1984 | Reiniger | 209/4 |
| 4,561,933 | 12/1995 | Wood et al. | 162/5 |
| 4,780,179 | 10/1988 | Clement | 162/5 |
| 4,785,239 | 11/1988 | Bruneth et al. | 324/204 |
| 4,820,379 | 4/1989 | Darlington | 162/5 |
| 4,865,690 | 9/1989 | Bernard et al. | 162/4 |
| 4,974,781 | 12/1990 | Placzek | 241/17 |
| 5,004,664 | 4/1991 | Fuller et al. | 430/106.6 |
| 5,015,367 | 5/1991 | Klimpel et al. | 209/166 |
| 5,069,751 | 12/1991 | Chambler et al. | 162/5 |
| 5,080,759 | 1/1992 | Bazby et al. | 162/158 |
| 5,100,066 | 3/1992 | Frei | 241/21 |
| 5,102,500 | 4/1992 | Darlington | 162/5 |
| 5,141,598 | 8/1992 | Richman et al. | 162/5 |
| 5,151,155 | 9/1992 | Cody et al. | 162/5 |
| 5,171,427 | 12/1992 | Klimpel et al. | 209/166 |
| 5,173,176 | 12/1992 | Klimpel et al. | 209/166 |
| 5,200,034 | 4/1993 | Richmann et al. | 162/5 |
| 5,211,809 | 5/1993 | Naddeo et al. | 162/6 |
| 5,213,661 | 5/1993 | Naddeo et al. | 162/6 |
| 5,217,573 | 6/1993 | Tsai et al. | 162/5 |
| 5,221,433 | 6/1993 | Daute et al. | 162/5 |
| 5,224,604 | 7/1993 | Duczmal et al. | 209/221 |
| 5,225,046 | 7/1993 | Borchardt | 162/5 |
| 5,227,019 | 7/1993 | Borchardt | 162/6 |
| 5,228,953 | 7/1993 | Bast et al. | 162/5 |
| 5,238,538 | 8/1993 | Jagamadth et al. | 162/4 |

FOREIGN PATENT DOCUMENTS

| 58-3073 | 1/1983 | Japan . |
| 6456156 | 3/1989 | Japan . |
| 199477 | 8/1991 | Japan . |

OTHER PUBLICATIONS

Falconer, T., "Magnetic Separation Techniques", Plant Engineering, Feb. 20 1992, pp. 85–87.
Altieri, A.M. and Wendel, J. W., Jr., "Deinking of Wastepaper," TAPPI Monograph Series 20.31, 1967, pp. 110–114.

*Primary Examiner*—Brenda Adele Lamb
*Attorney, Agent, or Firm*—Terry B. McDaniel; Daniel B. Reece, IV; Richard L. Schmalz

[57] ABSTRACT

An improved process is disclosed for deinking waste paper which contains laser, electrostatic, and other non-impact printing toners/inks to produce high quality (high brightness, little to no dirt content) pulp with little or no fiber loss. The process involves attachment of ink particles in the waste paper pulp to a magnetic carrier material with the help of an agglomeration agent followed by removal of the attached ink particles by magnetic separation. The magnetic treatment preferably is conducted at ambient or greater temperature, at neutral to alkaline pH, and at a low pulp consistency. Agglomeration and magnetite addition, followed by exposure of the repulped waste paper to a magnetic field provides near complete ink removal over exposure to the magnetic field without such pretreatment. Also, the process may be employed as an additional step in a conventional process for removing inks from reprographic printed papers, such as ink removal by screening, flotation, centrifugal cleaning, washing, and sedimentation with or without decantation.

14 Claims, 3 Drawing Sheets

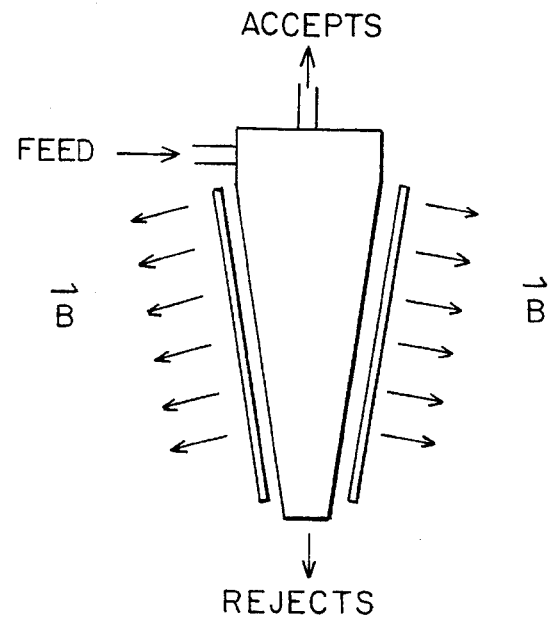
FIG. 2
FIG. 3
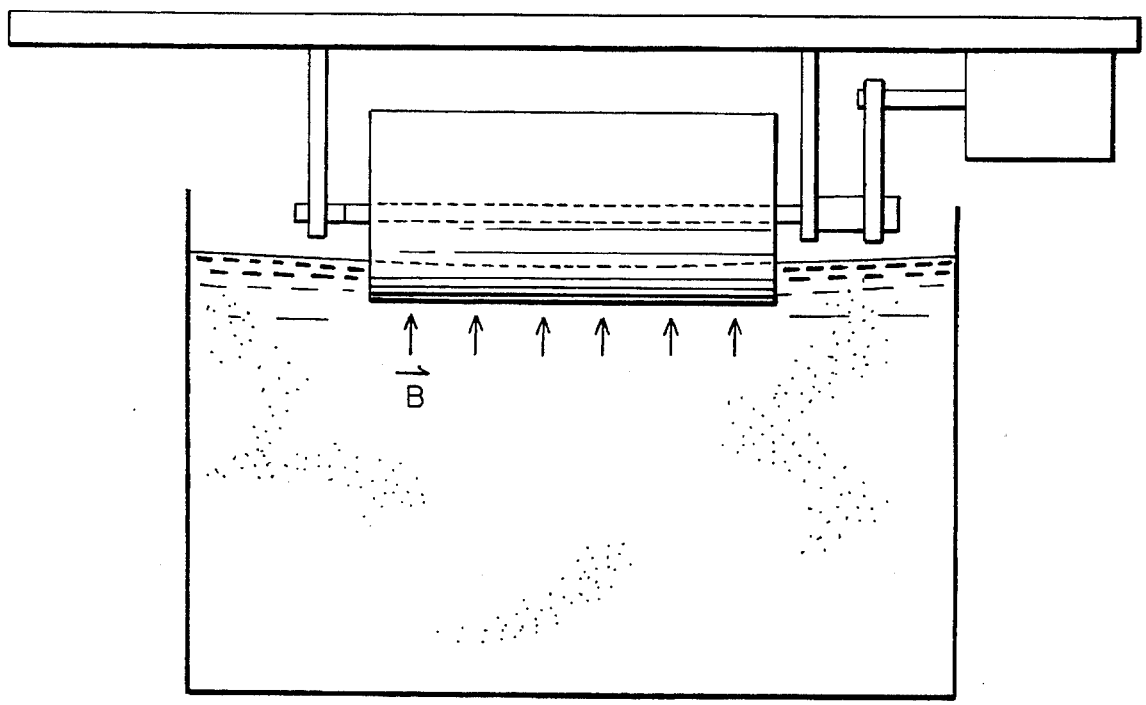

MAGNETIC DEINKING OF WASTE PAPERS

This is a continuation-in-part application of co-pending application Ser. No. 08/183,746, filed Jan. 21, 1994.

BACKGROUND OF THE INVENTION

1. Field of the Invention.

The present invention relates to a method of deinking waste paper (secondary fiber). More particularly, this invention relates to deinking secondary fibers contaminated with non-impact magnetic inks by subjecting a slurry of the fibers to a magnetic field.

2. Description of the Prior Art.

Waste paper, also known as secondary fiber, has long served as a source of raw fiber material in papermaking. Waste paper materials invariably contain one or more contaminants including inks, dye colors, fluorescent whitening agents, and "stickies" (sticky or tacky contaminants including adhesives, binders, plastic films, coatings, and the like). Sorted waste paper has had most of these contaminated papers removed and represents a higher, more expensive grade of waste paper. The growing utilization of secondary fibers in many types of paper products has made it necessary for paper manufacturers to process lower grades of waste paper (i.e., unsorted waste paper). While various methods have been employed to remove the contaminants to permit incorporation of the secondary fibers with virgin pulp in papermaking, such lower grade furnish is more heterogeneous and typically contains significantly more contaminants than a higher quality waste paper. Conventional treatment methods may not be adequate to permit incorporation of a significant percentage of unsorted waste papers.

Current approaches to processing recycled fibers can be classified as repulping (sluicing of fibers and partial detachment of ink/contaminants from fibers), coarse and fine screening (separation of fibers from contaminants by size and shape), centrifugal cleaning (separation based on density differences relative to fibers and reduction in size of ink/contaminants by mechanical action), flotation (separation by preferential adsorption of detached ink/contaminants onto air bubbles), washing (separation of small entrained particles from fibers by relative flow of water passing by fibers) and refining. There is an optimum particle size range for separation of particles from fibers in each of these processes. Depending upon the specific cleanliness requirements for the deinked pulp, it takes a combination of most or all of these processes to cover the size range of particles that one typically encounters. Both the washing and flotation processes depend on the proper use of surfactants. Depending on the relative strength and size of the hydrophilic versus hydrophobic portion of the surfactant molecule, the surfactant will cluster around ink and other contaminant particles, rendering the particles either hydrophilic (for washing) or more hydrophobic (for flotation). The opposing natures of washing surfactants and flotation surfactants can cause problems in combination flotation/washing systems.

Certain specific removal approaches have been disclosed for specific waste paper contaminants:

U.S. Pat. No. 5,211,809 discloses removing color from dyes from secondary pulps with non-chlorine based bleaching agents in treating sequences using oxygen with combinations of peroxide, ozone, and/or hydrosulfite at controlled pH conditions (less than 8 or greater than 10).

U.S. Pat. No. 5,213,661 teaches using oxygen to reduce the tackiness of stickies in secondary pulps and, optionally, using oxygen with alkali and/or detackification agents for optimum stickies control. U.S. Pat. No. 5,080,759 teaches introducing a water-soluble organotitanium compound into the water system of a papermaking process containing the secondary fiber to reduce the tackiness and adhesive properties of the stickies contaminants.

Also, published Japanese Patent Application No. HEI 3[1991]-199477 teaches a method of recycling used paper containing either fluorescent white paper or colored paper or both by introducing ozone into a dispersed slurry of said used paper.

While waste paper contaminants such as dyes, whiteners, and stickies present real problems in recycling, the most common removal problem is with inks. Printing inks have been classified broadly as impact and nonimpact inks.

Impact inks are used in conventional printing processes such as letterpress, flexography, and lithography. These inks are pressed or laid onto the paper but do not fuse with it. They generally consist of a pigment suspended in an oil-based alkaline aqueous medium. The paper industry has been successfully deinking papers containing impact inks for years using washing and/or flotation type systems.

Also, U.S. Pat. No. 4,381,969 teaches bleaching waste paper containing encapsulated constituents such as inks by repulping the waste paper in the presence of an aqueous alkaline solution which contains a peroxide compound such as hydrogen peroxide.

Other patents disclosing deinking methods include:

U.S. Pat. No. 4,013,505, "Method of Deinking Printed Wastepapers";

U.S. Pat. No. 4,076,578, "Ink Removal From Waste Paper";

U.S. Pat. No. 4,147,616, "Apparatus for Deinking Printed Wastepaper";

U.S. Pat. No. 4,780,179, "Method for Producing Pulp from Printed Unselected Waste Paper";

U.S. Pat. No. 5,151,155, "Process for Deinking Wastepaper with Organically Modified Smectite Clay";

U.S. Pat. No. 5,221,433, "Deinking Wastepaper Using Alkoxylation Product of Carboxylic Acid Containing an OH Group and Alkylene Oxide";

U.S. Pat. No. 5,225,046, "Wastepaper Deinking Process";

U.S. Pat. No. 5,227,019, "Wastepaper Deinking Process";

U.S. Pat. No. 5,228,953, "Deinking Waste Paper Using a Polyglycol and a Phosphoric Ester Mixture"; and U.S. Pat. No. 5,238,538, "Method for Deinking Recycled Fiber by Applying Direct Current Electric Field."

Increasing amounts of secondary fiber, however, are generated from reprographic printing processes such as electrophotographic copying (e.g., xerography) and laser printing. These printing methods employ nonimpact inks. Nonimpact inks are comprised of a pigment and a thermoplastic resin. The resin is a bonding agent which fuses the pigment to the sheet and to other pigment particles. The pigments employed in nonimpact inks can be categorized as either iron-based or non-iron based (e.g., carbon based). The resin polymers become cross-linked and resistant to chemical and mechanical action, making nonimpact printed papers difficult to deink by conventional deinking processes. Once detached from the fibers the toner ink particles tend toward a size which is larger than that which can be efficiently handled by flotation or washing and too small to be removed by cleaners and screens. Various approaches have been disclosed specifically to remove reprographic type inks:

U.S. Pat. No. 4,561,933, "Xerographics Deinking";

U.S. Pat. No. 5,141,598, "Process and Composition for Deinking Dry Toner Electrostatic Printed Wastepaper"; and U.S. Pat. No. 5,217,573, "Removal of Laser Printer and Xerographic Ink from Recycle Paper."

Conventional deinking processes require high energy input and employ additives or solvents to assist the removal of reprographic type inks. Significant fiber loss results along with the ink removal. To economically employ this class of papers for recycling to higher grade, bright papers, a method is needed which removes the inks while retaining the fiber. Unfortunately, known ink removal processes, when employed to remove nonimpact inks, have the following common disadvantages:

high fiber loss (20–25%)
high solid waste
high capital costs (due to large equipment requirement)
low ink removal efficiency One method which overcomes these disadvantages, in part, is provided in co-pending application Ser. No. 08/183,746 which teaches the employment of a magnetic field to selectively remove the magnetic (i.e., iron based) inks. Inks not affected by (or responsive to) a magnetic field (i.e., non-iron based, such as carbon pigments), however, will not be removed effectively by the use of a magnetic field and will be left behind with the secondary fibers. Likewise, other contaminants not susceptible to a magnetic field, such as stickies, are not typically attracted to a magnet for removal from a slurry of repulped secondary fibers. According to calculations from survey data from eleven major toner manufacturers and distributors compiled and reported by the Institute of Paper Science Technology (IPST) (*Technical Program Review Report:* January 1991–January 1992), about 70% of the commercial toners are carbon based. In fact, the IPST report notes that the inorganic components typically make up less than 5% of the overall toner composition. Thus, there is a need to develop a method to enhance magnetic deinking in furnishes containing a significant portion of non-iron based inks as well as iron based inks.

Therefore, the primary object of this invention is to provide an improved magnetic deinking method for removal of electrostatic ink particles from non-magnetic and magnetic inks, as well as additional non-magnetic contaminants, such as stickies.

SUMMARY OF THE INVENTION

The above stated object of the invention is achieved by (1) repulping waste paper which contains reprographic printed papers containing magnetic and non-magnetic inks and possibly containing other non-magnetic contaminants, such as stickies, (2) adding magnetite and agglomerant to the pulp slurry, and (3) subjecting the treated pulped waste paper at low pulp consistency to a magnetic field to remove the inks therefrom. Preferably, after magnetite and agglomerant addition, caustic is added to the pulp slurry prior to application of the magnetic field. More preferably, the magnetic treatment is conducted at ambient or higher temperatures, at pulp consistencies up to about 4%, and at neutral to alkaline pH. The magnetite/agglomerant/caustic/magnetic field treatment of the repulped waste paper can be used alone or as an additional step in a conventional process for removing inks from reprographic printed papers, such as ink removal by screening, flotation, centrifugal cleaning, washing, and sedimentation and/or decantation.

BRIEF DESCRIPTION OF THE DRAWINGS

FIG. 2 is a cross-section depiction of the application of a magnetic field externally to a forward cleaner in a paper pulp manufacturing process.

FIG. 3 is a cross-section depiction of the application of a magnetic field in a tank containing waste paper pulp slurry via a magnetic rotating drum partially submerged in said tank.

DESCRIPTION OF THE PREFERRED EMBODIMENT(S)

Figure 1:
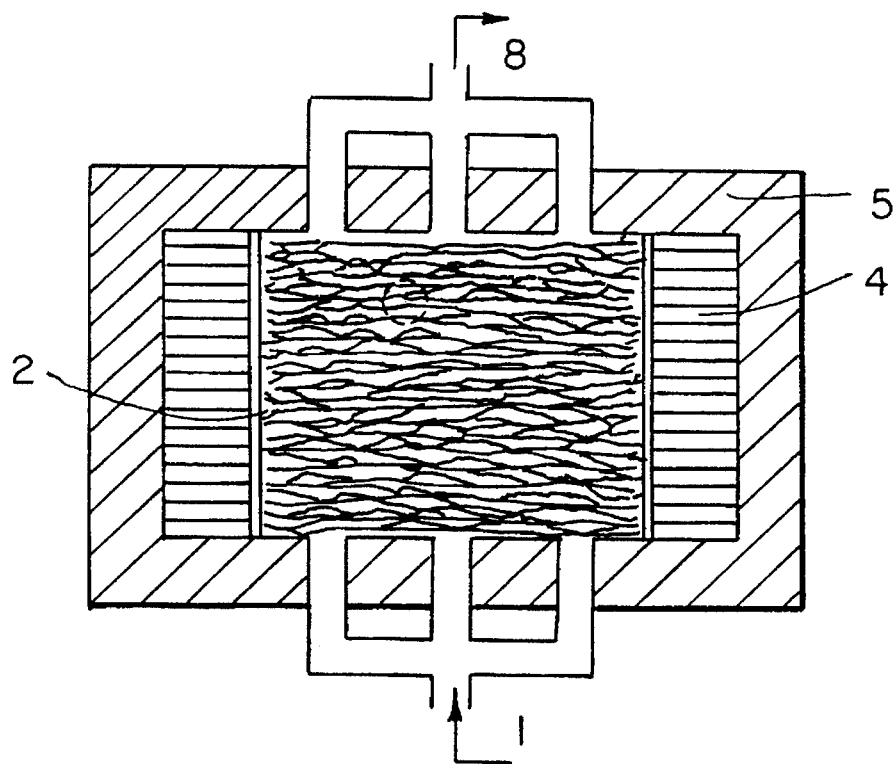
FIG. 1 is a cross-section depiction of the application of a high gradient magnetic separation technique for magnetic separation of ink particles.

As reported in co-pending application Ser. No. 08/183, 746, magnetic treatment was found to be very effective in removing toner inks and, in particular, the visible particles (>60 μm diameter). In the pulp and paper industry, pulp consistency (in water) is described generally as high (>15%), medium (7–15%), or low (<7%). Obviously, at medium and high consistency ink particle pathways toward a magnetic field may be blocked. Therefore, the invention method is preferably employed at low consistency. Also, the process achieves beneficial results under acid conditions above a pH of 4, although it is preferably employed at a neutral to alkaline pH. The preferred conditions for the magnetic treatment of the repulped mixed office waste is at from about 25° to about 65° C., at a pH of from about 7.0 to about 11.0 and at a pulp slurry consistency of from about 0.3 to 2.0%.

As magnetic separation is a physical rather than a chemical process and only particulate material is susceptible thereto, efficient magnetic ink removal should involve a pretreatment to separate any fused or bound inks from the repulped fibers, such as adsorption, coagulation/flocculation, and/or precipitation. Also, the particles to be magnetically separated must be attracted to the magnetic field of the magnet. Since many nonimpact inks are carbon-based rather than iron-based, in order to achieve near complete (>99.5%) ink removal by magnetic separation, this improved deinking process involves addition of a magnetic carrier material for attachment to (and subsequent removal of) the non-iron based particulates. Use of a magnetic carrier consisting of ferromagnetic and paramagnetic materials permits consistent high efficiency ink removal in waste papers containing xerographic and laser inks consisting of various levels of carbon-based and iron-based inks.

When using a magnetic carrier material in magnetic deinking it is essential that the binding forces between the particles to be removed and the carrier material exceed the hydrodynamic forces which are exerted on the particle by the fluid. The attachment strength of the binding forces depends on the components to be removed and is governed by colloidal and chemical forces. Auxiliary substances that enhance the attachment of the magnetic carrier to the particles to be removed include surfactants or blends of surfactants with relatively low HLB values (HLB equals the ratio of weight percentages of hydrophilic to hydrophobic groups in the molecule), preferably $\leq 10$. Suitable materials are those compounds whose molecules exhibit a long hydrophobic "tail" and a cloud point of above 65° C. Additional auxiliary substances may include montmorillonite, aluminum salts, ion exchangers, and polymers. In particular, a commercial agglomeration agent (or "agglomerant"), believed to be a blend of low HLB surfactants, is used in the following examples.

Even though both inks and magnetite particles are mutually hydrophobic and, therefore, mutually attractive, the resultant attractive forces are not strong enough to withstand the mechanical agitation in the repulper. Thus, it is understood that the addition of the agglomerant serves to modify the surface chemistry of the system such that the presumably large hydrophobic tail of the agglomerant migrates and attaches itself to the surface of each hydrophobic particle (ink and magnetite) in the system. The resultant increase in attractive forces between particles promotes agglomeration. Also, the ink particles become soft and tacky at temperatures above 60° C. which contributes to agglomeration. Then, on lowering the temperature to below 60° C., preferably below 50° C., by pulp dilution, the formed agglomerates become hard and rigid; and as they contain some magnetic field susceptible material, they can be removed effectively by magnetic separation.

The present invention provides a new and improved deinking method for waste paper containing laser, electrostatic, and other non-impact printed toners which offers significant advantages over all other methods presently available. The major advantages of this new deinking process over presently available systems are: high ink removal efficiency; high fiber yield; low solid waste; compact process with low space requirements and low capital costs. Most importantly, the process produces extremely clean and bright reclaimed pulp for use in high grade products.

The following examples describe such treatment, as well as studies of selected variables, such as temperature, pH, and consistency, and provide an evaluation of the combination of flotation and magnetic deinking. Also disclosed is the process use of a high gradient magnetic separation technique for magnetic deinking on a commercial scale. These examples are provided for purposes of illustration and are not to be construed as limiting the invention.

EXAMPLE 1

Secondary fiber containing mostly xerographic and laser printed office waste was magnetically processed (without agglomerant and magnetite addtion) under various conditions of temperature, pH, and consistency. The experimental conditions and ink removal efficiencies are reported in Table I. All conditions were tested at a ten (10) minute magnetic treatment time. While the conditions tested were, conveniently, conditions found in waste paper repulping, it is appreciated that most conditions, especially magnetic treatment time and pulp consistency, will be a function of the strength of the magnetic field, which was constant in this experiment.

TABLE I

| Run # | Magnetic Deinking Conditions | | | Ink Removal |
|---|---|---|---|---|
| | Cons. % | Temp. °C. | pH | Efficiency % (1) |
| 1 | 0.3 | 25 | 8.5 | 95.2 |
| 2 | 0.3 | 45 | 8.5 | 94.7 |
| 3 | 0.3 | 65 | 8.5 | 95.5 |
| 4 | 0.3 | 25 | 10.5 | 93.5 |
| 5 | 0.3 | 45 | 10.5 | 96.4 |
| 6 | 0.3 | 65 | 10.5 | 96.6 |
| 7 | 0.3 | 25 | 4.1 | 76.7 |
| 8 | 0.3 | 45 | 4.9 | 72.0 |
| 9 | 0.3 | 65 | 4.3 | 87.0 |
| 10 | 1.0 | 25 | 8.4 | 95.1 |
| 11 | 1.0 | 45 | 8.4 | 96.7 |
| 12 | 1.0 | 65 | 8.4 | 95.3 |
| 13 | 1.0 | 25 | 10.7 | 93.8 |
| 14 | 1.0 | 45 | 10.4 | 96.5 |
| 15 | 1.0 | 65 | 10.6 | 95.5 |
| 16 | 1.0 | 25 | 4.1 | 81.6 |
| 17 | 1.0 | 45 | 4.1 | 67.3 |
| 18 | 1.0 | 65 | 4.7 | 89.4 |

(1) % reduction in ink particles of area >200 micron diameter

Magnetic deinking at pH of 4 to 5 was somewhat less effective relative to deinking at pH values of ~10.5 and ~8.5. The average ink removal efficiency for ambient temperature runs at acidic pH was 79.2% compared to 94.4% at alkaline pH. The average reductions in ink particles were 94.4% at 25° C., 95.4% at 45° C., and 95.7% at 65° C., when comparing runs under the alkaline pH values tested. Increasing the pulp consistency from 0.3% to 1.0% did not appear to impact magnetic deinking efficiency. The average ink removal in runs at alkaline pH and ambient temperature was 94.4% at 0.3% consistency and 94.5% at 1.0% consistency.

EXAMPLE 2

To determine the effectiveness of magnetic deinking in conjunction with flotation, the magnetic deinking treatment (without agglomerant and magnetite addition) was employed in the flotation cell of a waste paper repulping process by immersing two permanent magnets in the pulp slurry with periodic withdrawal of magnets to wipe off the attached ink particles. The pulp was at ambient temperature (~25° C.) and 1.0% consistency, and the magnetic treatment was employed for 20 minutes (no additional ink particles were deposited on the magnets after 20 minutes). After the magnetic treatment, flotation chemical and caustic were added to perform flotation deinking. In another case, magnetic deinking was performed after flotation. Handsheets made from the resulting pulps were analyzed for changes in ink specks, and the evaluation (comparisons with flotation alone and deinking alone) is reported in Table II.

TABLE II

| Sample | Ink Removal Efficiency % (1) | % Ink Not Removed |
|---|---|---|
| Flotation (2) | 97.6 | 2.4 |
| Flotation followed by Magnetic deinking | 99.1 | 0.9 |
| Magnetic deinking | 93.5 | 6.5 |
| Magnetic deinking followed by Flotation | 99.2 | 0.8 |

(1) % reduction in ink particles >200 micron diameter
(2) At 1% consistency, 45° C., pH 10.5 with 0.2% synthetic surfactant for 6 minutes The results show that magnetic deinking with pre- or post-flotation gave significantly greater ink removal (99+%) compared to flotation (97.6%) with no magnetic treatment. Currently, ink particle dispersion in combination with conventional deinking processes are used to achieve such ink removal efficiencies at the expense of significant fiber loss (20–25%). The elimination of pulp thickening for dispersion can be avoided with the invention magnetic deinking process.

EXAMPLE 3

Magnetic deinking, both with and without pretreatment with agglomerant and magnetite, was performed on repulped waste papers, collected from various sources, at 0.3% consistency, ambient temperature, and natural pH (~8.5) for ten minutes. Handsheets were made from the resulting pulp in each set of experiment and were tested for ink specks. The results are reported in Table III.

TABLE III

| Source | Ink removal Efficiency, % (1) | |
|---|---|---|
| | w/o pretreatment | w/pretreatment |
| I | 94.4 | 99.3 |
| II | 94.7 | 99.7 |
| III | 93.3 | 99.5 |
| IV | 71.1 | 99.8 |

(1) percent reduction in area of ink particles > 200 micron diameter

The lower ink removal (w/o pretreatment) from source IV paper presumably was due to the presence of higher levels of non-iron based inks in this furnish. Clearly, magnetic ink removal efficiency is greatly enhanced by employing the agglomerant/magnetite pretreatment.

EXAMPLE 4

For a clearer understanding of process parameters for the invention enhance deinking, the "worst case" paper (from source IV) was subjected to pretreatment by: (a) magnetite addition; (b) agglomeration; and (c) magnetite addition followed by agglomeration. In each case the pretreated pulp was deinked magnetically:

(a) The waste paper was repulped in the presence of magnetite powder (FeO, $Fe_2O_3$) in a British disintegrator/lamort hydrapulper at 68° C. to 72° C. for 30 minutes;

(b) The waste paper was similarly repulped without magnetite addition, and a commercial agglomerant (CDI 230) was added instead; and (c) Several runs were conducted wherein varying amounts of magnetite were employed, followed by 2% agglomerant addition. All results are reported in Table IV.

TABLE IV

| Treatment | Ink Reduction, % (1) |
|---|---|
| Magnetic deinking (md) | 71.3 |
| .05% magnetite/md | 71.2 |
| agglomeration (agg.)/md | 96.5 |
| .025% magnetite + agg./md | 99.4 |
| .05% magnetite + agg./md | 99.3 |
| .10% magnetite + agg./md | 95.6 |
| .20% magnetite + agg./md | 98.8 |

(1) percent reduction in area of ink particles ≧200 micron diameter

The use of magnetite alone did not improve the subsequent magnetic deinking efficiency; whereas, the agglomeration pretreatment followed by magnetic deinking greatly enhance ink removal, suggesting that aggregation of non-iron and iron-based inks was taking place. Finally, the magnetite addition prior to agglomeration resulted in a further significant improvement in ink removal upon magnetic deinking. In one run, only 0.6% of ink remained in the paper. The use of agglomerant and magnetite pretreatment followed by magnetic separation consistently provided a near complete ink removal (see Table III).

EXAMPLE 5

After establishing the potential of magnetic addition in combination with the agglomerant, an agglomeration optimization study was conducted. The impact of using lower than 2% agglomerant charge was evaluated on the performance of magnetic deinking. The agglomerant charge in the pretreatment was varied from 0.1% to 1.0% which using a constant magnetite charge of 0.05%. The results are shown in Table V.

TABLE V

| Agglomerant Charge, % (1) | Ink Removal Efficiency, % |
|---|---|
| 0.1 | 93.2 |
| 0.25 | 98.7 |
| 0.5 | 99.8 |
| 1.0 | 99.9 |

(1) Constant 0.05% magnetite charge

The invention process may involve less capital investment by interjecting the magnetic treatment at one or more of various treatment points in the conventional waste paper repulping process to enhance the effect of, or as a possible replacement for, such treatments. Examples of placements of the magnetic treatment are shown in the drawings.

EXAMPLE 6

Figure 1A:
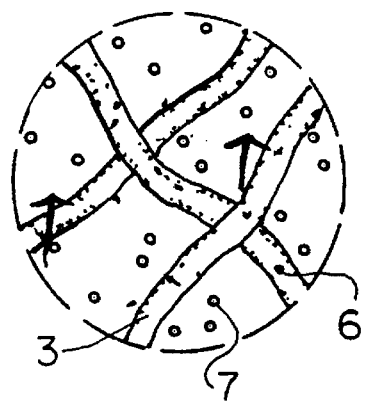
FIG. 1a is a magnified view of the internal (collector) portion of the high gradient magnetic separator depicted in FIG. 5.

While the invention process may employ magnetic separation via a permanent magnet or an electromagnet, high gradient magnetic separation (HGMS) technique was shown to be effective for possible implementation of this new deinking method on a mill-scale. The HGMS is used commercially to remove ferromagnetic and paramagnetic contaminants from waste water, steam condensated, and koalin slurries. In most HGMS applications, a matrix of steel wool, wire grids, or other types of collectors made of magnetic material are provided. FIG. 1 shows, in cross-section, a cyclic type high gradient magnetic separator into which a wet slurry of material containing magnetic or paramagnetic impurities is fed through inlet port 1 and passed through the collector bed 2. The bed 2 is comprised of interwoven steel wires or steel wire mesh 3 to provide both openings through which the slurry can pass as well as a large surface area which is magnetized to a relatively high magnetic gradient or flux density by the electromagnetic coils 4 for attraction of magnetically suseptible materials within the slurry. The coils 4 and collector 2 are contained within an iron enclosure 5. FIG. 1a shows that as the slurry flows through the collector 2 the magnetic and paramagnetic contaminants 6 are attracted and collected while the remaining portion of the slurry 7 flows through the system and exits outlet port 8. After some time, the unit is flushed with the magnet de-energized, to remove the retained contaminants.

The office waste pulps that had been pretreated with varying amounts of agglomerant were subjected to deinking by HGMS. The agglomerant charge in the pretreatment varied from 0.25% to 2.0% while using a constant magnetic charge of 0.05% at 45° C. for 45 minutes. The pretreated office waste pulp slurry at 0.5% consistency was passed through the column. Results are reported in Table VI.

TABLE VI

| Agglomerant, % | Visible Ink, ppm (1) | Ink Removal Efficiency, % (2) |
|---|---|---|
| 0.25 | 15 | 99.9 |
| 0.50 | 5 | >99.9 |
| 1.00 | 2 | >99.9 |
| 2.00 | 1 | >99.9 |

(1) Ink particles ≧40 microns in diameter
(2) % reduction in area of ink particles > 40 microns in diameter All tested agglomeration charges gave near complete ink removal.

FIG. 2 shows the application of the invention method by applying a magnetic flux source (i.e., magnet) immediately external to a conventional conical forward cleaner, such that the flux, or magnetic field, is effective internal to the cleaner. The magnetic flux will provide an additional force on the ink particles pulling them toward the wall of the cleaner body. This action pulls additional ink particles into the reject stream, improving deinking efficiency.

Figure 4:
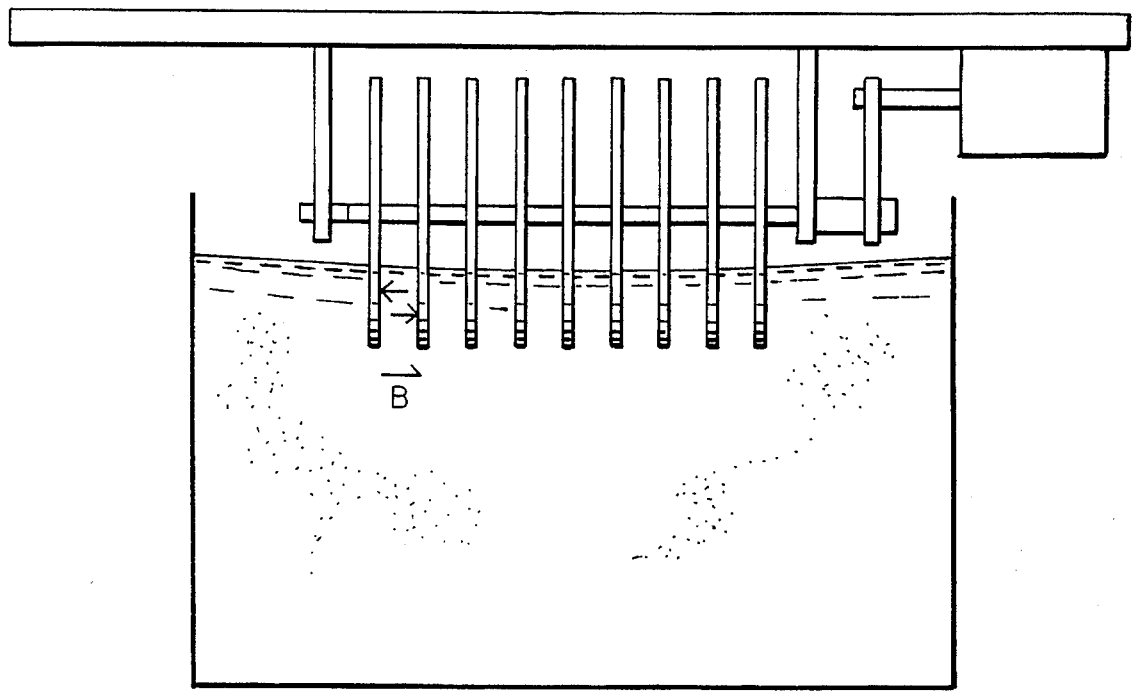
FIG. 4 is a cross-section depiction of the application of a magnetic field in a tank containing waste paper pulp slurry via a magnetic disk (in series) filter partially submerged in said tank.

FIGS. 3 and 4, respectively, show a magnetic rotating drum or disk filter arrangement employed to attract magnetically susceptible ink particles from the upper portion of a tank of waste paper slurry. This approach would be appropriate any time after the ink is detached from the fiber. The magnetic ink removal equipment should be positioned to remove the ink which tends to concentrate in the vortex area of a stirred tank.

Figure 5:
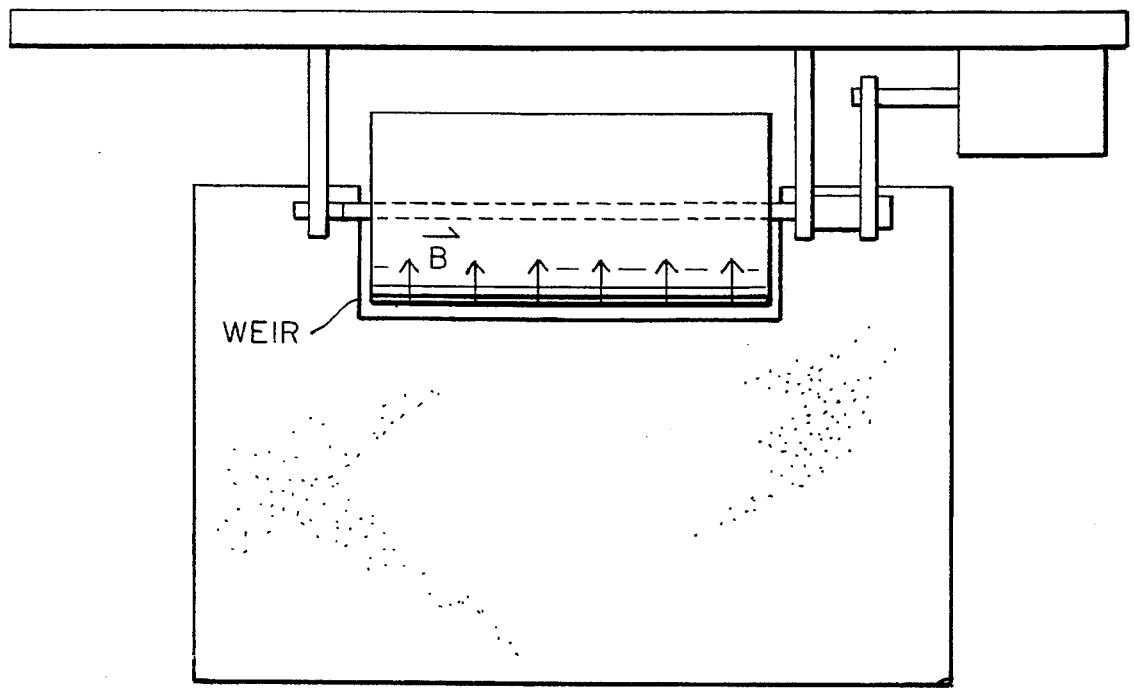
FIG. 5 is a cross-section depiction of the application of a magnetic field in a tank containing waste paper pulp slurry via a magnetic rotating drum situated in a weir within said tank.

FIG. 5 shows a holding tank configured with a magnetic rotating drum situated in a weir. All stock must pass though the narrow channel in which the drum is positioned. The ink becomes attached to the surface of the drum as it rotates through the slurry and is detached and removed outside the slurry.

As will be appreciated by those skilled in the art, the present invention may be embodied in other specific forms without departing from the spirit or essential attributes thereof; and, accordingly, reference should be made to the appended claims, rather than to the foregoing specification, as indicating the scope of the invention.

What is claimed is:

1. A process for deinking repulped waste paper stocks including xerographically and laser printed papers printed with inks selected from the group consisting of iron based and non-iron based inks comprising introducing a magnetic carrier material selected from the group consisting of ferromagnetic and paramagnetic materials to the stocks to attach the magnetic carrier material to particles of the non-iron based inks, followed by magnetic separation of the magnetic carrier material and the attached ink particles from the stocks.

2. The process of claim 1 further comprising aiding magnetic carrier material and ink particle attachment by a treatment selected from the group consisiting of flocculation, coagulation, and agglomeration employed after the magnetic carrier material addition and prior to the magnetic separation.

3. The process of claim 2 comprising introducing an agglomeration agent to the stocks prior to the magnetic separation.

4. The process of claim 3 wherein the agglomeration agent is selected from surfactants or blends of surfactants with HBL values of 10 or lower.

5. The process of claim 4 wherein the agglomeration agent is selected from compounds whose molecules exhibit a long hydrophobic "tail" and a cloud point of above 60° C.

6. The process of claim 2 conducted at from about 25° to 65° C., at a pH of from about 7.0 to about 11.0, and at a consistency of from about 0.3 to 2.0%.

7. The process of claim 2 further comprising an additional treatment step selected from the group consisting of screening, flotation, centrifugal cleaning, washing and sedimentation/decantation, or a combination thereof following the magnetic separation.

8. The process of claim 7 wherein the additional treatment step is flotation.

9. The process of claim 1 wherein the magnetic carrier material is magnetite.

10. The process of claim 1 conducted at ambient or higher temperatures, at pulp consistencies up to 4.0%, and at neutral to alkaline pH.

11. The process of claim 1 wherein the magnetic separation is conducted using a high gradient magnetic separator.

12. The process of claim 1 wherein the magnetic separation is conducted using a permanent magnet.

13. The process of claim 1 wherein the magnetic separation is conducted using an electromagnet.

14. The process of claim 1 wherein the process is employed in conjunction with a conical forward cleaner in the form of a magnetic flux source positioned immediately external to the cleaner.

* * * * *